June 16, 1942.　　V. KOBLER ET AL　　2,286,629
MOTOR
Filed July 17, 1939　　2 Sheets-Sheet 1
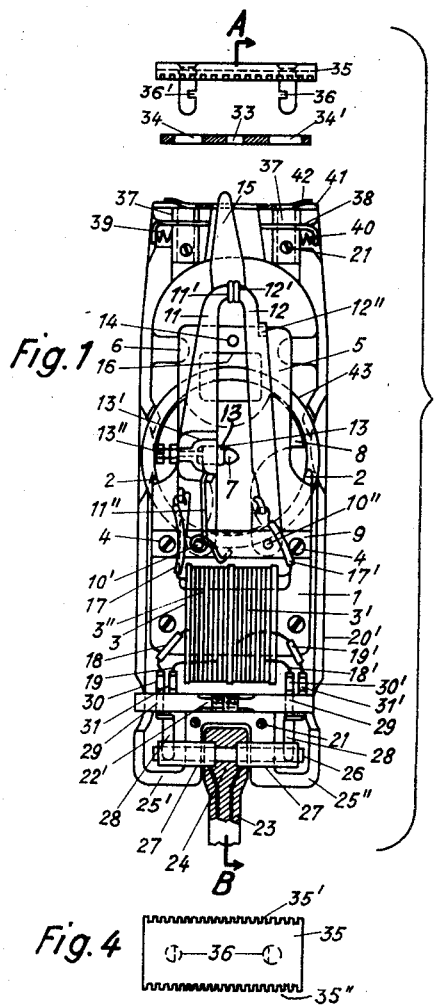
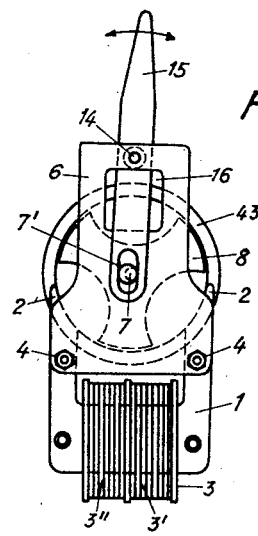
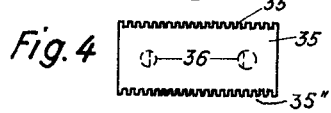
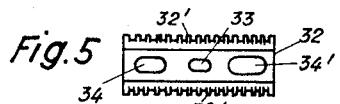
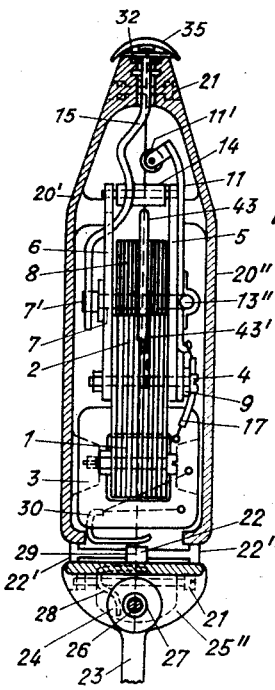
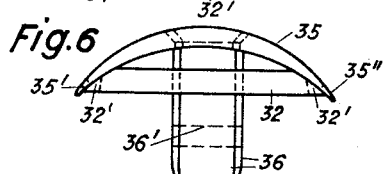
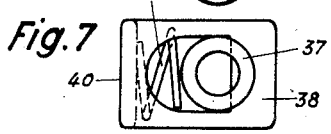
INVENTORS
Victor Kobler
Werner Kobler

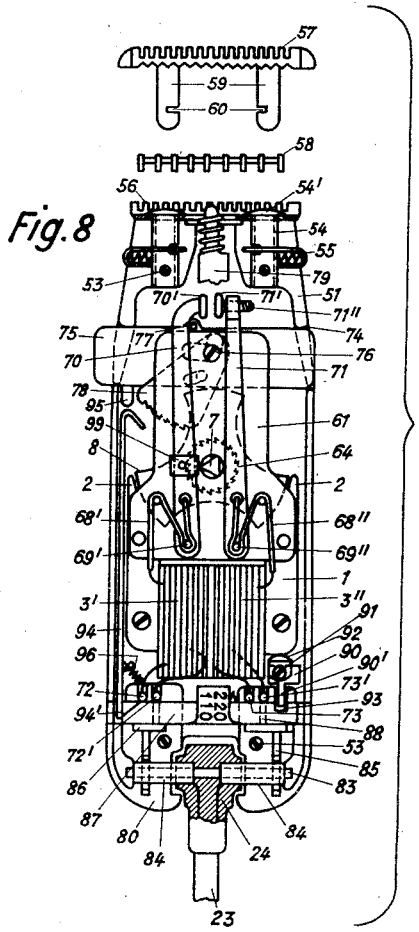
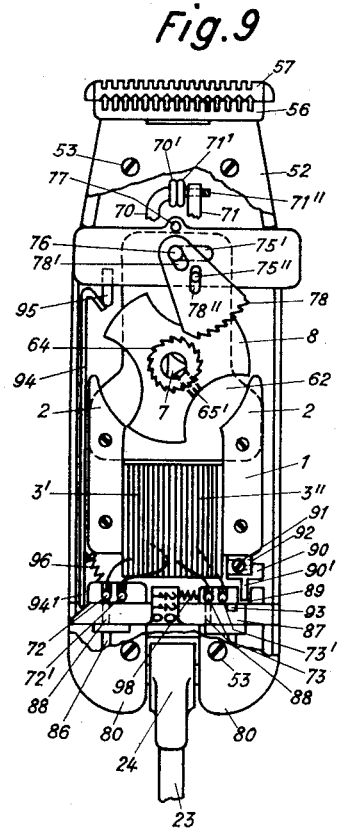
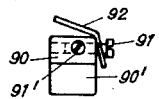
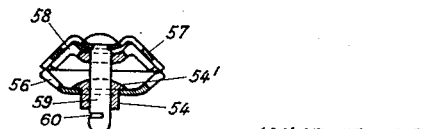

Patented June 16, 1942

2,286,629

UNITED STATES PATENT OFFICE 2,286,629

MOTOR

Victor Kobler and Werner Kobler,
Zurich, Switzerland

Application July 17, 1939, Serial No. 284,956
In Switzerland July 23, 1938

2 Claims. (Cl. 172—36)

This invention relates to dry shavers comprising small electric driving motors adapted for inclusion in a handle portion of the apparatus and operating at different voltages.

It is known to use a handle portion as holder of a cutter head, which handle portion contains a small electric driving motor for the driving of the cutter head. Such apparatus, owing to their room saving construction and their handy form, are suitable for use while on a journey, which is an important use of such devices.

Said small electric motors can be operated at various different voltages within a certain range, provided that the magnet coils are accordingly dimensioned. If, however, it is attempted to use such motors within wider ranges of voltages, they present the drawback that at high potentials, of for example 220 volts the motors run hot or at low potentials, of for example 110 volts, the drop in efficiency becomes unduly great depending upon whether the magnet coil is designed for a range of higher or lower potentials.

In order to permit devices provided with such motors to be connected to networks of widely varying potentials without risk of damage, for example, when used on a journey, it is conventional to employ motors of this kind the magnet coil of which is designed for low potentials with a view to connecting a resistance in series with the motor when only higher potentials are available. The necessity for equipping the devices with such resistances is, however, complicated and requires considerable space.

The object of this invention is to eliminate these drawbacks.

With this end in view, according to the invention, the dry shaver with a grip holding a cutterhead, which is operated by means of an electric aggregate, small electric driving motor and the like, said aggregate being built in the grip is distinguished by the arrangement of two or more circuits of different electrical resistance for the electric current to flow through and of switching means, for selectively changing over the electric current to either of these circuits.

A motor of this construction permits the device to be connected to networks of various different potentials but involves the risk that by erroneously ascertaining the voltage of the network in question or inadvertently setting the change-over switch to the wrong winding the device may be destroyed. Moreover, the ascertainment of the voltage available for the use of the apparatus at strange localities is often complicated and annoying, when journeying about.

According to another feature of the invention, this drawback is eliminated by the provision of means in a small electric driving motor included in the grip of a dry shaver, and comprising two or more circuits of different electrical resistance for the electric current to flow through, which means operate automatically to effect the change-over of current to the proper circuit in adaptation to the voltage of the local system.

Two embodiments of the invention are illustrated in the accompanying drawings. In the drawings:

Fig. 1 is a front elevation of a first embodiment of the invention with one half of the motor casing removed and with the operating elements of the cutter head for actuation by the motor shown separately, Fig. 2 shows a rear elevation of the motor with the motor casing omitted, Fig. 3 is a side elevation of the motor, showing the beard trimmer the handle of which accommodates the motor in a section on the line A—B in Fig. 1, Figs. 4 and 5 are top plan views of the two working elements of the cutter head respectively, Fig. 6 is an end view of the two interengaging working elements of the cutter head on a larger scale, Fig. 7 is a top plan view of a connecting sleeve for the cutter head on a larger scale, Fig. 8 is a front elevation of a second embodiment of the invention with one half of the motor casing removed and with the working elements of the cutter head to be actuated by the motor shown separately, Fig. 9 is a view similar to Fig. 8 with one half of the motor casing partly broken away and with the motor exposed, Fig. 10 shows a detail of the change-over device, and Fig. 11 is a sectional view of the cutter head.

Referring to Figs. 1–7 of the drawings, the numeral 1 designates the magnet core having pole shoes 2 formed of a stack of laminations of sheet iron arranged in side by side relation (Fig. 3). On each side of the core a shield 5, 6 respectively of insulating material is connected across the pole shoes by means of bolts 4 between which shields a laminated tripolar armature 8 is rotatably mounted by means of an axle 7. On the front shield 5 a bridge piece 9 is secured by the bolts 4 for sustaining two rupturing levers 11, 12 by means of small bolts 10', 10''. Each of these levers carries at its upper end a contact piece 11', 12' respectively. The lever 12 is immovably connected to the shield 5 by means of a clamp 12", whereas the lever 11 is rockable about the bolt 10' as a pivot and is urged by means of a spring 11" against the axle 7 the adjacent end of which is of triangular cross section and serves as an abutment for a stop 13 accommodated in a socket 13' of the lever 11.

By action of the three-sided end of shaft 7 lever 11 is reciprocated, when this shaft rotates, with the result that during each revolution the contact 11', 12' is opened and closed three times. A set screw 13" serves for displacing the stop 13, whereby the range of movement of lever 11 is adjusted.

Between the shields 5 and 6 is rockably mounted by means of a pivot 14 a two-armed rocking member 15 one arm of which grips behind the rearside of the motor through a window 16 in the shield 6 and rocks to and fro by action, of an eccentric pin 7' arranged on the rear end of the shaft 7.

On the magnet core is arranged a two-part coil 3 comprising windings 3', 3" the inner ends of which are connected by means of connecting pieces 17, 17' to the levers 11, 12 and through these to the contact pieces 11', 12'. The two windings 3', 3" form a continuous coil, when the contact 11', 12' is closed, the sense of winding being such that in connecting the outer ends of the windings to a supply of electric current the current passing through the coil reverses the polarity of the pole shoes. By this means the armature is rotated until two of its poles register with the pole shoes. The relative disposition of the three-sided end of the shaft 7 and the poles of the armature must be so chosen that at this moment the two contact pieces 11', 12' are separated by rocking movement of the lever 11. By thus rupturing the current the magnetic flux is interrupted so as to prevent the rotating armature from being retained in position by the poles. On further rotation of the armature the contact is closed, whereupon the cycle of operations is repeated, in known manner.

The windings 3', 3" are each provided with two connecting tabs 18, 19 and 18' and 19' respectively. The tabs 18, 18' are connected to the outer ends of the windings, while the tabs 19, 19' are connected to inner portions thereof. Depending upon whether the supply of electric current is selectively connected to the outer ends of the windings 3' 3" or to the tabs connected to inner portions of the windings current passes through the total number of convolutions formed by the two windings 3' 3" or only through the inner portions thereof.

On the motor casing which consists of the two symmetrical halves 20', 20" screwed together by means of bolts 21 (Fig. 3) is arranged a change-over switching device composed of a slide 22 having a two-armed numeral carrier 22'. The ends of the slide 22 are accessible for shifting the slide from both narrow sides of the casing through corresponding apertures.

The supply cord 23 having a thickened end 24 is rockably mounted between two swells 25', 25" on the casing by means of a pin 26 protruding through the thickened cable end. On the pin 26 consisting of electric insulating material two metal sleeves 27 are secured with each of which one end of the conductor of the supply cord 23 is connected. Terminals 28 arranged on both sides of the casing collect the current from the two metal sleeves 27 and conduct it over to two contact studs 29 inserted in the slide 22. Depending upon the position of the slides current conductive connections are established with the terminals 30, 30' connected to the connecting tabs 18, 18' on the outer ends of the windings 3, 3' or with the terminals 31, 31' connected to the connecting tabs 19, 19' on inner portions of these windings. Therefore, the electrical current can be selectively changed-over to the windings of different resistance in accordance with the requirement for passing the current through the whole coil or only through an inner portion thereof.

The length and the cross sections of the two different circuits can be so chosen that the magnetic fluxes are of a required strength irrespective of whether the current follows a circuit having impressed thereon a potential of a higher voltage, for example, 22 v. or another circuit having impressed thereon a lower potential, of, for example, 110 v.

The position of the numerals provided on the numeral carrier arms 22' of the slide 22, one of which numerals is visible through a window on the front side and one through a window on the rear side of the casing, indicate to which voltage the motor is set. Since, as aforementioned, the kind of motor involved is adaptable to a relatively considerable range of voltages, it is advantageous, to exhibit on the numeral carrier arm on one side thereof the lower limit of the allowable range of voltages, for example, 110 v. and on the other side the upper limit, for example, 145 v. and to exhibit, when the circuit is changed over to the range of higher voltages, for example on the one hand 150 v. and on the other hand 220 v.

Instead of interrupting the circuit between the two windings disposed side by side, as previously described, the arrangement may be such, that on the magnet core only one winding is provided and the circuit is broken at one end of the supply loop. Also with this modification current can be supplied selectively to either end of the coil or to an inner portion of the coil, so that two circuits of different electrical resistance are formed.

The cutter head actuated by the rocking member 15 is composed of a movable working element or cutting member 32 and a fixed working element or cutting member 35 provided with the two guide studs 36 which serve as guides for the movable cutting member and as connecting members for securing the cutter head to the handle-like casing formed of the two symmetrical halves 20', 20". The movable cutting member is provided with a slot guide 33 for the reception of the rocking member 15 and with two guide slots 34.

Housed in recesses of the two casing halves are two sleeves 37, which are provided with holes 21' for securing them in position by the upper fastening bolts 21 for the casing projecting through these holes. Each of the two sleeves 37 is provided with a slide 38, which takes into a groove of the sleeve, for the purpose of securing in position the guide studs 36 on the fixed cutting member 35 by means of corresponding kerfs 36'. A spring 39 provides a locking for the connection. In order to unlock the connection projections 40 on the slide projecting from the casing on both sides thereof are pressed on each other, whereby the slide releases the cutter head. A spring 42 which is inserted in a groove 41 in common with both casing halves serves for urging the movable cutting member against the fixed cutting member.

If the contact 11', 12' is open when the circuit is connected to the supply loop the motor is not automatically started. In order to permit the motor to be set in motion the armature is surrounded by a ring 43 of insulating material, for example, fibre or the like. This ring is secured in grooves 43' (Fig. 3) of the pole shoes and projects on the narrow sides of the casing out of corresponding slots so that it can be turned from outside and the armature together with it. This arrangement allows of making both casing halves 20', 20'' symmetrical and to construct the handle as flat as can be. Instead of providing a ring surrounding the armature loosely there is also a possibility of fixing the ring to the armature.

In the second embodiment of the invention shown in Figs. 8 to 11, the numerals 51, 52 refer to the two halves of the motor casing which are fastened together by means of bolts 53 so as to form a closed box. These casing halves hold by means of grooves connecting sleeves 54 provided with latches 55. The sleeves 54 secure to the casing a serrated guard member 56 by means of head pieces 54', which guard member forms together with a removable upper cutting member 57 an outer two-part tubular cutter head, the said parts of which cooperate with an inner cutting member 58 for the cutting of hair. The upper cutting member 57 is provided with two studs 59 serving for insertion in the sleeves 54 and having locking kerfs 60 for locking engagement with the latches 55.

In the handle-shaped casing is housed a small electric motor composed of a front shield 61 and a rear shield 62. In Fig. 9 the front shield is broken away for exposing the other parts of the motor to view. Between the two shields 61, 62 is rotatably mounted the tripolar armature 8 driven by means of a pinion 64 arranged on the axle 7 of the armature. Between these shields is further arranged the magnet core 1 provided with the pole shoes 2. On the yoke of the magnet core 1 are arranged the two windings 3', 3'' side by side. The inner ends of the two windings are connected to springs 68', 68''. Pivots 69', 69'' serve as fulcrums for rupturing levers 70, 71, respectively, which are resiliently urged toward each other by the springs 68', 68''. Each of these rupturing levers is provided at its upper end with a small contact plate 70', 71', respectively. The contact plates 71' can be held at a predetermined distance apart from the contact plate 70' by means of a screw shank 71'.

If the contact 70', 71' is closed as shown in Fig. 9, the two magnet windings 3', 3'' form a continuous coil. The two windings 3', 3'' are provided with connecting pieces 72, 72' and 73, 73' respectively. The connecting pieces 72, 73 are secured to the outer ends of the windings 3', 3'' respectively, while the connecting pieces 72', 73' are connected with these windings at inner portions thereof. Depending upon whether the electric current is conducted into the windings 3', 3'' at the outer ends or at inner portions thereof through the connecting pieces connected to said portions, the entirety of convolutions formed by the two windings 3' 3'' or only the inner part thereof is traversed by current.

A switch 75 is displaceably arranged in lateral slots 74 in the casing. The displacement of the switch 75 is limited by a slot 75' and a pivot 76. In the position of the switch shown in Fig. 8 the lever 70 is so rocked by the stud 77 of the switch 75 that the rupturing contact 70', 71' is opened. For starting the motor the switch 75 is shifted to the position shown in Fig. 9. During this operation a toothed sector 78 mounted on the pivot 76 by means of a slot 78' cooperates with its teeth with the teeth of the pinion 64, due to a stud 75'' on the switch 75 rocking the toothed sector 78 by projecting into a slot 78'' of this sector. The slot 78'' is so directed, that the stud 75'', when shifted in one direction, urges the toothed sector toward the pinion 64, so that the mating teeth on these two parts interengage. If, however, this stud is shifted in the other direction, the toothed sector is raised, thereby moving the teeth of the toothed sector out of engagement with the teeth of the pinion.

In displacing the switch in the manner previously described the armature 8 is rotated by cooperation of the teeth of the toothed sector with those of the pinion. At the same time the stud 77 releases the lever 70 by which means a stop 99 on the lever 70 comes to bear on the three-sided end of the pivot 7. The position of the three-sided end shown in Fig. 9 permits the lever 70 to be rocked toward the middle of the apparatus to such an extent that the two contact plates 70', 71'' contact with each other, whereby the circuit is closed. The electromagnetic flux thus set up between the pole shoes 2 turns the two nearest poles of the armature into registry with the pole shoes so that the armature is rotationally displaced into the position shown in Fig. 8. At this moment the lever 70 is rocked in the opposite direction by cooperation of the stop 99 with the three-sided end of the shaft 7, so that the contact 70', 71' is opened and thus the magnetic flux is interrupted, whereby the armature is released for starting out on its travel unhindered, thereby beginning a new cycle of operations.

Each revolution of the armature has the effect that the contract 70', 71' is opened and closed three times. The relative disposition of the axle 7, that is, the three-sided end thereof and the pole shoes can be so adjusted by means of the set-screw 65' that the opening and the closing of the contact takes place somewhat earlier or later. The opposite end of the axle 7 is provided with an eccentric pin, in a known manner, which operates to move to and fro a rocking member 79 which is rockably mounted by means of a pivot 76 and of which, for the sake of clarity, only the upper end serving for moving the inner cutting member 58 to and fro is shown in the drawing.

The bottom portion of the apparatus is provided with two swells 80 between which the thickened end 24 of the supply cord 23 is rockably mounted by means of a pin 83. The pin 83 protruding through the thickened end 24 of the supply cord is made of insulating material and is provided on both sides with contact sleeves 84 with which the two conductors of the supply cord are connected. Connecting elements 85 conduct the electric current on these two sides to terminal members 86. Between these terminal members on the one hand and the connecting pieces 72, 72' and 73, 73' on the other hand a slide 87 of insulating material is arranged which is provided at both ends with small metal contact studs 88. The slide 87 is displaceably arranged in a groove 87' of the casing.

In the position of the parts shown in Fig. 8 the electric current is conducted from the two lateral terminal members 86 to the connecting pieces 72', 73' respectively by means of the contact studs 88, whereby the electric current traverses only a portion of the magnet windings 3', 3'', whereas in the position of the slide 87 shown in Fig. 9 the electric current is conducted from the terminal members 86 to the connecting pieces 72, 73, whereby the whole coil formed by the magnet windings 3', 3'' is put in circuit.

The two positions of the slide 87 are indicated by a numeral carrier 88' the numerals of which are visible through corresponding windows arranged in the casing on opposite sides and in the middle plane thereof.

In the drawing, these windows are omitted for the sake of clarity, it being, however, shown, for example, in Fig. 8 that the numeral representing 110 v. is placed beyond the middle, while in the position of the slide shown in Fig. 9, the same arrangement is adopted for the numeral representing 220 v.

Fig. 8 show the slide 87 in initial position in which magnet windings calculated for a low range of voltages ranging, for example, between 110 and 150 v. are put in circuit. In a groove 89 of the casing an iron body 90 is displaceably arranged by means of a nose 90'. A leaf spring 92 connected to the body 90 by means of a set screw 91 (Fig. 10) bears on the magnet core so that the iron body 90 is resiliently urged against the slide 87. By this means the nose 89 projects into a recess 93 of the slide 87, thereby locking this slide in initial position. A compression spring 98 tends to displace the slide 87 to the left into the position shown in Fig. 9. Apart from being secured in initial position by the nose 90' and the recess 93, the slide is secured in this position by the end 94' of a push rod 94. When the motor is connected which, as hereinbefore described, is effected by shifting the switch 75 from the position shown in Fig. 8 into that shown in Fig. 9, a stud 95 provided in the slide 75 releases the upper end of the push rod 94 in consequence of which this rod is displaced upwardly by action of the compression spring 96, as illustrated in Fig. 9.

If the motor is connected to a network of a low voltage, for example 110 to 150 v. the magnetic force is insufficient for displacing the iron body 90 toward the magnet core against the effort of the spring 92 and thereby to retract the nose 90' out of engagement with the recess 93 of the slide. If, however, the apparatus is connected to a supply line of a higher voltage, for example, 200 to 220 v. the magnetic attraction on the iron body 90 is, at the moment of the cutting in of the switch, at which time the magnetic flux is notwithstanding a maximum, so great that it is displaced toward the magnet core in spite of the effort of the spring 92, so that nose 90' disengages from the recess 93 in the slide and the slide 87 is displaced by action of the spring 98 into the position shown in Fig. 9 in which position the magnet windings calculated for this range of higher voltages are put in circuit.

By means of the screw 91 (Fig. 10) the spring effort can be regulated and the changing over can be adjusted to the desired voltage. The set-screw 91' locks the screw 91 in the desired position.

If the motor is stopped by shifting the switch 75 so as to come at rest in the position shown in Fig. 8 the stud 95 positively forces the upper obliquely inwards bent end of the push rod 94 downwardly and thus also the rod itself by which means the lower end 94' of the push-rod pushes the slide 87 by engagement with the slanting surface of the adjacent end of the slide into initial position, as shown in Fig. 8.

For producing the effort necessary for operating the switching device for changing over the electric current to the different magnet windings, in this instance, the magnet core of the motor itself is utilized. It goes, however without saying that other forms of the invention are possible in which to this end separate electromagnets are provided. Moreover, a further form incorporating the provision is feasible that on both sides of the magnet coil spring influenced iron bodies are arranged the inherent spring of which is varied, so that by means of the two iron bodies different coils resulting from different combinations of windings can be put in circuit.

Various changes and modifications may be made in the constructive details without departing from the inventive idea and the scope of the appended claims is not to be considered as limited except as specified therein.

Having now particularly described and ascertained the nature of our said invention and in what manner the same is to be performed, we declare that what we claim as new is:

1. In a dry shaver having a handle holding a cutter head, operated by means of an electric driving motor built in the handle, said electric motor comprising a plurality of circuits of different electrical resistance for the electric current to flow through, and automatic means including a slide for effecting the change-over of current to the proper circuit in adaptation to the voltage of the local system, said slide being connected with means for starting and stopping the motor which positively returns the slide into its initial position when the motor is stopped.

2. In a dry shaver having a handle holding a cutter head, operated by means of an electric driving motor built in the handle, said electric motor comprising a plurality of circuits of different electrical resistance for the electric current to flow through, and automatic means including a slide operating to effect the change-over of current to the proper circuit in adaptation to the voltage of the local system, said slide being connected with means for starting and stopping the motor which positively returns the slide to its initial position when the motor is stopped, said slide effecting in its initial position conductive connection to the circuit that is designed for a range of lower voltages.

VICTOR KOBLER.
WERNER KOBLER.